US010699835B2

(12) United States Patent
Goers et al.

(10) Patent No.: US 10,699,835 B2
(45) Date of Patent: Jun. 30, 2020

(54) BISTABLE SOLENOID VALVE DEVICE AND METHOD FOR DETERMINING AN ARMATURE POSITION OF A BISTABLE SOLENOID VALVE

(71) Applicant: WABCO Europe BVBA, Brussels (BE)

(72) Inventors: Andreas Goers, Pattensen (DE); Otmar Struwe, Hannover (DE); Andreas Teichmann, Isernhagen (DE)

(73) Assignee: WABCO EUROPE BVBA, Brussels (BE)

( * ) Notice: Subject to any disclaimer, the term of this patent is extended or adjusted under 35 U.S.C. 154(b) by 117 days.

(21) Appl. No.: 16/081,438

(22) PCT Filed: Feb. 2, 2017

(86) PCT No.: PCT/EP2017/000135
§ 371 (c)(1),
(2) Date: Aug. 31, 2018

(87) PCT Pub. No.: WO2017/153030
PCT Pub. Date: Sep. 14, 2017

(65) Prior Publication Data
US 2019/0348206 A1  Nov. 14, 2019

(30) Foreign Application Priority Data
Mar. 5, 2016  (DE) .................. 10 2016 002 677

(51) Int. Cl.
*H01F 7/18* (2006.01)
*F16K 31/08* (2006.01)
(Continued)

(52) U.S. Cl.
CPC ......... *H01F 7/1844* (2013.01); *F16K 31/082* (2013.01); *G01D 5/2013* (2013.01);
(Continued)

(58) Field of Classification Search
CPC ................ H01F 7/1844; H01F 7/1615; H01F 2007/185; H01F 2007/1692;
(Continued)

(56) References Cited

FOREIGN PATENT DOCUMENTS

| DE | 3730381 A1 | 3/1989 |
| DE | 102005041873 A1 | 3/2007 |

(Continued)

OTHER PUBLICATIONS

DE 102007016787; Schultz Wolfgang; Oct. 9, 2008 (Year: 2008).*
DE 102011081921; Siemens AG; Feb. 28, 2013 (Year: 2013).*
DE 102005041873; Linde AG; Mar. 2007 (Year: 2007).*

*Primary Examiner* — Dharti H Patel
(74) *Attorney, Agent, or Firm* — Leydig, Voit & Mayer, Ltd.

(57) ABSTRACT

A bistable solenoid valve device for a fluid system includes a bistable solenoid valve and a detection device. The bistable solenoid valve has a permanent magnet yoke, an armature configured to be displaced between a first armature position for contact against a first core to form an air gap with a second core and a second armature position for contact against the second core to form an air gap with the first core. The bistable solenoid valve device further includes a detection device configured to evaluate and/or measure a first inductance of the first armature coil, and evaluate and/or measure a second inductance of the second armature coil without displacement of the armature, to compare the inductance of the first armature coil and the inductance of the second armature coil, and to output a state signal that indicates the armature position.

20 Claims, 8 Drawing Sheets

(51) Int. Cl.
    *G01D 5/20*           (2006.01)
    *H01F 7/16*           (2006.01)
    *H01H 11/00*         (2006.01)

(52) U.S. Cl.
    CPC ....... *H01F 7/1615* (2013.01); *H01H 11/0062* (2013.01); *H01F 2007/1684* (2013.01); *H01F 2007/1692* (2013.01); *H01F 2007/185* (2013.01)

(58) Field of Classification Search
    CPC ........ H01F 2007/1684; H01H 11/0062; G01D 5/2013; F16K 31/082
    USPC ....................................................... 361/160
    See application file for complete search history.

(56) References Cited

FOREIGN PATENT DOCUMENTS

DE     102007016787 A1   10/2008
DE     102011081921 A1   2/2013

\* cited by examiner

BISTABLE SOLENOID VALVE DEVICE AND METHOD FOR DETERMINING AN ARMATURE POSITION OF A BISTABLE SOLENOID VALVE

CROSS REFERENCE TO RELATED APPLICATIONS

This application is a U.S. National Stage Application under 35 U.S.C. § 371 of International Application No. PCT/EP2017/000135 filed on Feb. 2, 2017, and claims benefit to German Patent Application No. DE 10 2016 002 677.4 filed on Mar. 5, 2016. The International Application was published in German on Sep. 14, 2017 as WO 2017/153030 A1 under PCT Article 21(2).

FIELD

The invention relates to a bistable solenoid valve device for a fluid system, in particular in a utility vehicle, and to a method for detecting an armature position of a bistable solenoid valve.

BACKGROUND

In a fluid system, such as a compressed air system, bistable solenoid valves permit displacement between two valve positions, wherein the two valve positions can be maintained when the solenoid valve is in a non-energised state. Generally, the bistable solenoid valve comprises a permanent magnet device and an armature, which can be displaced relative to said permanent magnet device and which has energisable armature coils. Depending upon the energisation of a first armature coil or second armature coil, the armature can be displaced into its first armature position or second armature position, in which it is held securely after the switching current is deactivated, i.e. in the non-energised state.

Electro-pneumatic hand brakes with a bistable solenoid valve device permit the pneumatic actuation of the hand brake, wherein it is not necessary to supply energy and thus no energy consumption is required when parked and/or when driving. Moreover, no current and thus no energy consumption is necessary during the drive, i.e. when the parking brake is disengaged.

Document DE 37 30 381 A1 discloses a bistable solenoid valve of this type, which makes permanent magnet holding force possible in both of its positions. An armature is provided here that can be displaced between its armature positions and that strikes at a first end core or a second end core in its armature positions, wherein an air gap is formed with the other end core in each instance. The effect of the air gap is that the permanent magnet field running through each end core is weaker than the permanent magnet field running between the other end core and the armature without an air gap. In its armature positions and/or valve positions, the armature closes off the respectively appropriate fluid passages with its sealing means.

SUMMARY

In an embodiment, the present invention provides a bistable solenoid valve device for a fluid system. The bistable solenoid valve device includes a bistable solenoid valve. The bistable solenoid valve has a permanent magnet yoke with a first pole base and a second pole base for the formation of a first ferromagnetic circuit and a second ferromagnetic circuit, an armature consisting of a magnetically conductive material configured to be displaced between a first armature position for contact against the first core to form an air gap with the second core and a second armature position for contact against the second core to form an air gap with the first core. The bistable solenoid valve further has a first armature coil for supplying current for a displacement into the first armature position, a second armature coil for supplying current for a displacement into the second armature position, and a final stage for supplying current to in each case one of the armature coils for a displacement of the armature. The bistable solenoid valve device further includes a detection device configured to evaluate and/or measure a first inductance of the first armature coil, and evaluate and/or measure a second inductance of the second armature coil without displacement of the armature, to compare the inductance of the first armature coil and the inductance of the second armature coil, and to output a state signal that indicates the armature position.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
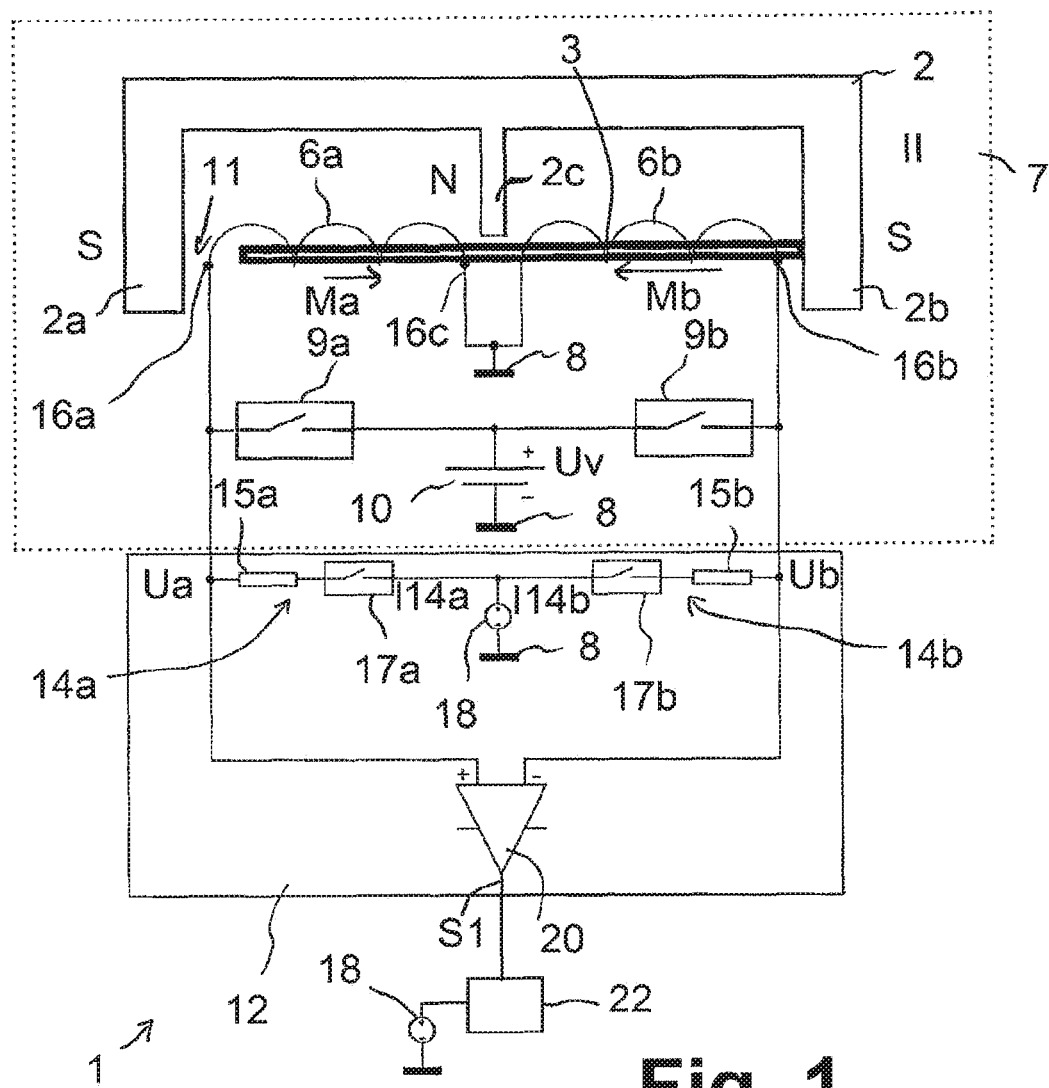
FIG. 1 depicts a circuit diagram of a bistable solenoid valve device according to an embodiment of the invention.

It can happen in some situations, however, that the exact armature position and thus the valve position is unknown or uncertain. For example, vibrations during the journey can generally result in a displacement of moveable parts, for example including the armature. After it has been activated, e.g. when the vehicle is started, the control system of the fluid system initially is generally not aware of the state of its devices or initially assumes that the devices and elements are in a non-energised initial state. When a bistable solenoid valve is used, for instance in an electro-pneumatic hand brake, the brake control system thus does not know, for example, whether the vehicle was parked with an engaged or unengaged hand brake, wherein any memory entries are initially too uncertain when the vehicle is started.

Test displacements or returns by the bistable solenoid valve into one of the two positions can generally impede driving operations or cause unnecessary displacements.

Thus a test check of a parking brake when in the parked state could result in a release of the brake and an uncontrolled movement of the vehicle. While the car is moving, a test of the state of the electro-pneumatic parking brake could lead to an actuation and thus to braking, which could result in dangerous driving situations.

Embodiments of invention permit a safe testing of the switching state of a bistable solenoid valve device with relatively little effort. Embodiments of the invention provide bistable solenoid valve devices and methods for detecting an armature position. According to embodiments of the invention, valve positions are determined by evaluating or measuring inductances of two armature coils and comparing the inductances without a displacement of the armature. To this end, the bistable solenoid valve device has a detection device.

Embodiments of the invention provide the advantage that the sensing of the switching state is permitted by a sensing of the armature position without displacement and thus without interfering with the fluid system. The valve position and/or armature position can thus be tested before the journey begins as well as routinely during the drive, for example, without any critical or dangerous situations arising as a result.

According to a preferred embodiment, the detection device has measurement paths, by which each of the armature coils can be energised. This achieves the advantage that the armature coils are energised independently of the power energisation of the armature coils to displace them. The measurement paths are preferably connected to a comparison device, which compares the measured values of the measurement paths, e.g. measuring voltages, to each other.

According to embodiments of the invention, the respective armature position leads to influence on the permanent magnet field and the inductance of the armature coil; thus the effective inductance of the armature coil is increased at the position where the armature rests upon the core and is reduced when an air gap is formed between the armature and core. This means that the armature coil in particular that permits a displacement of the armature position by energisation has a lower effective inductance than the other armature coil.

By measuring the inductances, a fundamental statement can be made about the armature position and/or the position of the air gap; a reliable statement becomes possible as a result of comparing the inductances of the two armature coils.

According to one embodiment, a measuring voltage source, which is different from the supply voltage source that is provided to displace the armature, is advantageously provided to measure the inductances. This makes it possible to ensure that energisation for the measurement occurs without displacement of the armature.

By designing the measurement paths with a shared measuring supply voltage, a measurement can take place when the measurement path is activated, for example, by a measuring switching device, which is separated from the electrical activation of the power displacement of the armature. Measuring voltages can thus be tapped as galvanic voltages and compared directly with each other, without the power switch devices being actuated to displace the armature.

Advantageously, each of the measurement paths has a measuring resistor, which can be provided in particular in a series connection with the respective armature coil, so that a voltage drop or voltage divider switch is formed, on which a measuring voltage of the respective measurement path can be tapped. The comparison device can thus compare the measuring voltages of the measurement paths, e.g. as a comparator for simultaneously comparing the measuring voltages or else, for example, as a microcontroller for successively comparing the measuring voltages. The measuring resistors are advantageously identical so as to form directly comparable measuring voltages. The two measurement paths are advantageously linked to their respective armature coils via a common measuring supply voltage, and so comparable measurements are made when the measurement paths are energised.

Advantageously, the bistable solenoid valve device is generally configured symmetrically in its armature coils and measurement paths, i.e. with a symmetrical permanent magnet device and/or a symmetrical magnetic design of an armature core of the armature, and in particular with identical or comparable armature coils and measuring resistors.

In particular, the measuring voltages can be tapped as electrical voltages applied to the armature coils and can be compared to each other, especially in a voltage divider switch between the measuring resistor and the armature coil, respectively.

The measurement facilitated by embodiments of the invention can therefore be carried out quickly and securely, and a measuring switch device is actuated and the measurement paths are activated, for example.

By comparing the measurements of the two measurement paths, i.e. energising the first armature coil and the second armature coil, the difference between the active armature position and the non-active or not activated armature position in each case can be calculated directly. So temperature changes, for example, and other influences may result in absolute changes in the measured values, but the result of the comparison is not influenced by the symmetrical configuration.

Alternatively to the configuration of separate measurement paths, an extensive integration of the detection device into the end stage, i.e. the power current paths, is possible to activate the armature coils. Thus, according to one embodiment, shunt resistors can be connected in series with the armature coils and a power switch device and can be connected to the supply voltage source. A shunt resistor in this case can be selected to be sufficiently low-impedance, e.g. a few ohms, so that the power currents and/or switching currents are not significantly influenced by it and the power loss is not high. The voltages across the shunt resistors can be tapped directly as measuring voltages, and the measuring voltages can be compared in a comparison device, e.g. an operational amplifier or comparator. Thus the shunt resistors can be provided in particular on contact connections that are provided anyway, such as the armature coils, with respect to ground.

According to embodiments of the invention, measurement paths can be formed parallel to the power switch devices, and to connect this parallel switch in series with each armature coil between supply voltage terminals. Advantageously, a measuring resistance is provided here that is high enough that when a measuring switch device is actuated only a weak measuring current flows, which—at least within the switching time required for the measurement—does not result in a displacement of the armature. A shared supply voltage source can in turn be used to form the detection device and as a final stage.

In embodiments such as this with a shared voltage source, i.e. where the supply voltage source is used both for power displacement between the armature positions and for measurement, only minor additional hardware expenses are necessary.

However, even in embodiments with an additional measuring voltage source, which is different from the supply voltage source, suitable synergistic effects can be achieved by using e.g. a voltage source and/or supply voltage of the control system, i.e. of the microprocessor provided in the control system. Microprocessors of this type generally have, for example, supply voltages of 3.3 volts and/or 5 volts, which can thus also be used to supplement the activation of a separate measurement path, without an additional voltage source being required.

Essentially, a final power stage can also be energised only very briefly—without any modifications to the equipment or hardware—so that no power displacement occurs between the armature positions, and the measured values achieved by the measurement, i.e. current and/or voltage as a function of time, are compared to each other.

In particular, the measurement can detect and/or take into account the behaviour of the two armature coils, which changes over time and which is influenced by the inductance. The measurements can be made during a start-up process and/or during a shut-down process, i.e. in particular after a measuring switch device is closed or opened. On the one hand, a measurement can be made after a predetermined period of time following the closing and/or opening of the measuring switch device, wherein measuring currents or measuring voltages of the measurement paths can be compared. On the other hand, a measurement can take place after a period of time until a predetermined reference voltage is achieved during the start-up or shut-down process.

In particular, according to embodiments of the invention, an electro-pneumatic hand brake is also produced with the bistable solenoid valve device, which allows for inspections with little effort, including little energy consumption, and a reliable statement without influencing the state of the hand brake.

A solenoid valve device 1 shown in FIG. 1 comprises a solenoid valve 7 and a detection device 12. The solenoid valve 7 has a permanent magnet yoke 2, which is symmetrical with three poles, having a centre pole, here the north pole N on a centre core 2a and/or centre pole base, and having axially outer poles, here the south poles S, which are formed on a first core (pole base) 2a and a second and/or right core (pole base) 2b. Accordingly, a magnet configuration inverse to this one is also possible.

An armature 3 consisting of magnetically conductive ferrous material is provided in the permanent magnet yoke 2 such that it is longitudinally adjustable in its axial direction (A). A left (first) armature coil 6a and a right (second) armature coil 6b are fixed in place and are each connected to ground 8 by a (e.g. common) terminal 16c and are connected by their other terminal 16a or 16b to a supply voltage source 10 with a supply voltage +Uv via a power switch 9a or 9b. Thus by closing the first (left) power switch 9a, a first armature circuit from the supply voltage Uv via the closed first power switch 9a can connect the first armature coil 6a to ground 8, and accordingly a second armature circuit can ground the second armature coil 6b via the second power switch 9b.

The power switches 9a and 9b can be combined in such a way that only one of the two is closed at a time, e.g. as a combined switch or toggle switch. In the non-energised state, the armature 3 assumes its most recent armature position in each case, which as such is stable. FIG. 1 shows the right-side armature position II, in which the armature 3 rests against the right (second) core 2b, and so no air gap remains between the armature 3 and the second (right) core 2b, whereas an air gap 11 is formed between the armature 3 and the left magnetic pole 2a. Therefore, owing to the lack of an air gap between the armature 3 and the right core/magnetic pole 2b, a right-hand permanent magnet field Mb is larger than a left-hand permanent magnet field Ma between the left core/magnetic pole 2a and the centre core 2c, which forms the north pole N. The armature 3 is thus retained against the right core 2b.

When, proceeding from the position in the figure, the left circuit is subsequently closed by closing the left (first) switch 9a and thus a switching current (I-schalt) flows from the supply voltage source 10 via the closed power switch 9a and the left (first) armature coil 6a to ground 8, then the left (first) armature coil 6a is energised as a result, and so the left permanent magnet field Ma is thereby amplified and, accordingly, the first magnetic force that attracts the armature 3 to the left magnetic pole 2a becomes stronger than the second magnetic force that contains the stronger right permanent magnet field Mb and holds the armature 3 in the right armature position shown. Thus the armature 3 is displaced from the right armature position II shown by FIG. 1 to the left armature position I, whereby the air gap 11 between the left magnetic pole 2a and the armature 3 is closed and, accordingly, an air gap 11 is formed on the right side between the armature 3 and the right magnetic pole/core 2b, which attenuates the right-side permanent magnet field Mb. During the subsequent opening of the first switch 9a, the left armature position I then subsequently also remains stable.

In order to detect the armature position, a detection device 12 is provided which, according to FIG. 1, has a left (first) measurement path 14a and a second (right) measurement path 14b as well as a comparison device 16. The first measurement path 14a has a first (left) measuring resistor 15a and a first measuring switch device 17a, which are connected in series between the first (left) coil terminal 16a and a measuring voltage source 18. The first measurement resistor 15a has large enough dimensions that, when the first measuring switch device 17a is closed, no first measuring current I-14a of the same strength is flowing that is sufficient to displace the armature 3. The second measurement path 14b, in turn, is symmetrical to the first measurement path 14a, i.e. the second measurement resistor 15b and the second measuring switch device 17b are connected in series between the measuring voltage source 18 and the second (right) coil terminal 16b. The measuring resistors 15a and 15b are selected to be identical.

The entire solenoid valve device 1 shown in FIG. 1, with the solenoid valve 7 and the detection device 12, is configured symmetrically. The comparison device 20 is configured as a comparator with input terminals 20a and 20b, i.e. a positive input and a negative input, is in turn connected to the coil terminals 16a and 16b with basically any polarity.

Figure 3:
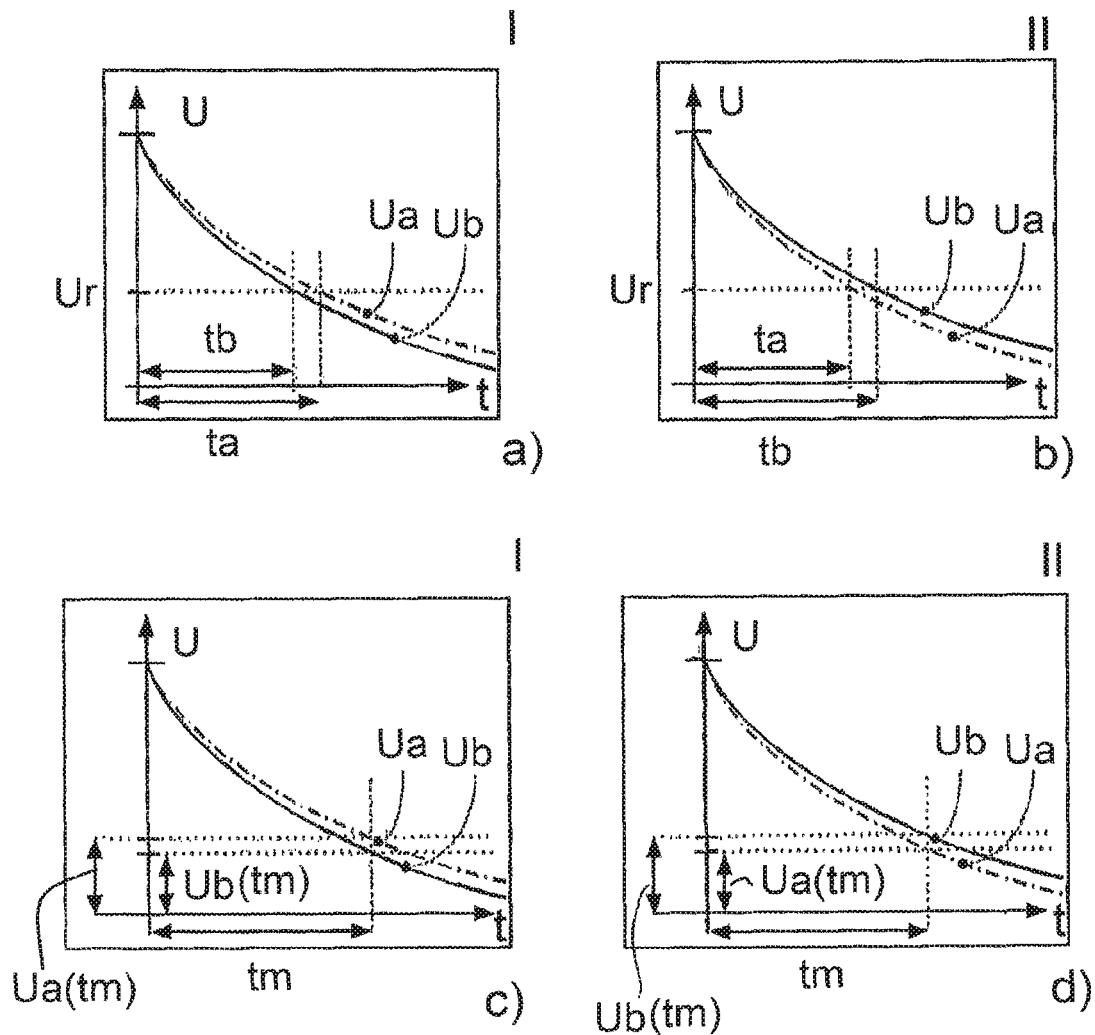
FIG. 3 depicts measurement diagrams of the voltage as a function of the time of the induction measurements in various armature positions, each with a time measurement and a voltage measurement, in embodiments with measuring resistance on the positive side.

The measurement processes performed with the detection device 12 are shown in greater detail in FIG. 3. Each of FIGS. 3a to 3d shows measuring voltages Ua and/or Ub, which are applied to the coil terminals 16a, 16b during a measurement process. By closing the first measuring switch device 17a, a first measurement circuit is closed, through which the measuring voltage 18 flows to ground 8 with a measuring voltage U, e.g. also Uv, via the closed first measuring switch device 17a, the first measuring resistor 15a and the first (left) armature coil 16. Thus a first RL link is formed as a series connection of the measuring resistor 15a and of the first armature coil 6a and has a specific time behaviour that is dependent upon the ohmic resistance and the inductance; in a solid measuring resistor 15a, 15b, the time constant ta, tb depends upon the respective inductance La, Lb. In this instance, the inductances depend upon the armature position; in the right-hand armature position II shown in FIG. 1, the first (left) armature coil 6 has a lower inductance La than in the first armature position I.

According to embodiments of the invention, it is recognized in particular here that a meaningful comparison cannot be carried out by measurements in the various armature positions, but rather, in the present case, can also be performed without actuating the armature by comparing the armature currents that flow through the measurement paths 14a and 14b when the power switches 9a and 9b are open. The measuring resistors 15a and 15b serve in this case to tap the measuring voltages Ua and Ub, i.e. in particular to decouple the measuring voltage source 18.

The measurement currents in the measurement paths 14a and 14b are thus according to the time constant and/or cut-off frequency $\omega g(14a)=R15a/La$ and $\omega g(14b)=R15b/Lb$, wherein the resistances R(15a) and R(15b) are equal, i.e. R(15a)=R(15b).

By comparing the left and right sides in this symmetrical arrangement, it is also possible in particular to make a measurement without displacing and/or activating the armature 3 and thus without displacing the entire solenoid valve device 1.

The right armature position II shown in FIG. 1 is shown in the measurements according to FIGS. 3b and 3d; accordingly, FIGS. 3a and c show the first (left) armature position I:

According to FIG. 3b, the closed measuring switch devices 17a and 17b are opened successively or also simultaneously. In the measurement circuit according to FIG. 1 with a comparator 20, it makes sense to open the measuring switch devices 17a and 17b simultaneously. A temporally non-constant current flow is thus created through each of the two measurement paths 14a, 14b and the armature coils 6a and 6b, with measuring currents I-14a through the first measurement path 14a and I-14b through the second measurement path 14b, wherein the measuring currents I-14a, I-14b results in a voltage drop at the coil terminals 16a and 16b, and the measuring voltages Ua and Ub are thus formed.

After the measuring switch device 17a and 17b is opened, the measuring circuits are interrupted, and so the magnetic field established in the armature coils 6a and 6b degrades, with the time constants ta and tb, which depend upon the identical measuring resistors R15a=R15b and the inductances La, Lb. In the armature position II shown in FIG. 1, the inductance L of the second (right) armature coil 6b is greater than the first inductance La of the first (left) armature coil 6a, so that tb≥ta. This can be seen in the measurements according to FIG. 3b and FIG. 3d. According to FIG. 3b, the right measuring voltage Ub falls more slowly than the left measuring voltage Ua in accordance with the solid line, wherein it is determined according to FIG. 3b when the measuring voltages Ua and Ub reach a comparative voltage (reference voltage) Ur; accordingly, time ta≤time tb.

According to the measuring process in FIG. 3d, which is an alternative to the above and which corresponds to the measuring circuit in FIG. 1, the measuring voltages Ua and Ub are compared directly to each other, and so the comparator 20 displays a status signal Uv or 0 volts and/or a logical 1 or 0 depending upon which measuring voltage Ua or Ub is greater. In this case, a measurement can take place after a relevant measuring time tm, for example, in which a sufficiently significant difference is to be expected. According to FIG. 3d, the case in which Ub(tm)≥Ua(tm) occurs in armature position II in FIG. 1, and so the comparator 20 thus generates the value S=0 at the measurement time, since Ub is applied at the negative input of the comparator 20 and is greater than Ua.

In the measurements according to FIGS. 3a and 3c, which are symmetrical thereto, the first armature position I is present, wherein a measurement is made in FIG. 3a that corresponds to FIG. 3b, and a measurement is made in FIG. 3c that corresponds to FIG. 3d.

Figure 2:
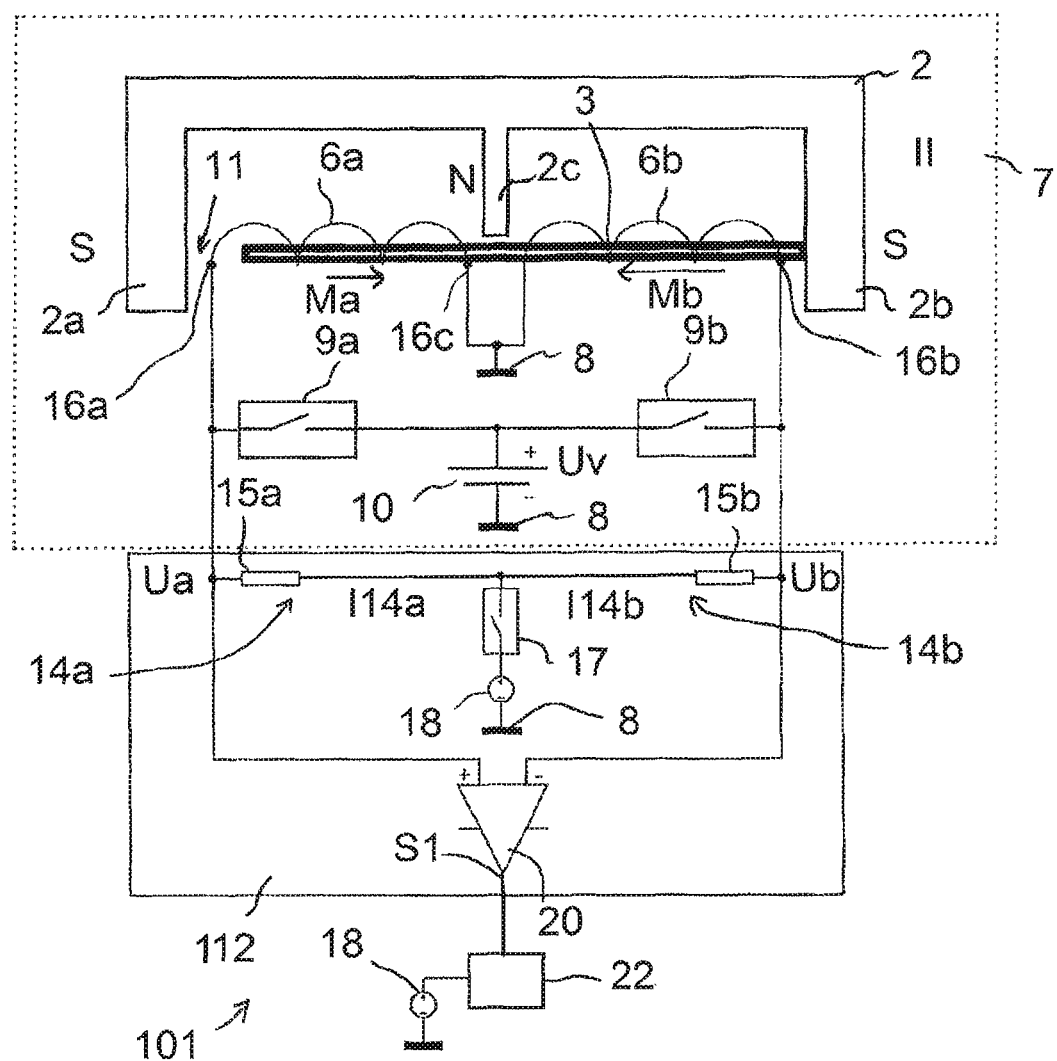
FIG. 2 depicts a solenoid valve device with a detection device according to an embodiment of the invention.

The embodiment in FIG. 2 is modified relative to FIG. 1 such that the two measuring switch devices 17a and 17b are replaced by a common measuring switch device 17. Using the detection device 12 in FIG. 2, it is thus possible to perform measurements in each case in which the measurement paths 14a and 14b are opened and closed at the same time and measurements therefore occur simultaneously, as has already been described with FIG. 3.

When another comparing device is used instead of comparator 20, measurements can also be carried out successively, which is possible in FIG. 1 with separate measuring switch devices 17a and 17b; the measuring voltages Ua and Ub can then be read out successively, e.g. via the measurement port of a microcontroller, and subsequently compared to each other. The measurements should occur in immediate succession so that changing conditions like temperature etc. do not lead to changes in the measurements.

Figure 4:
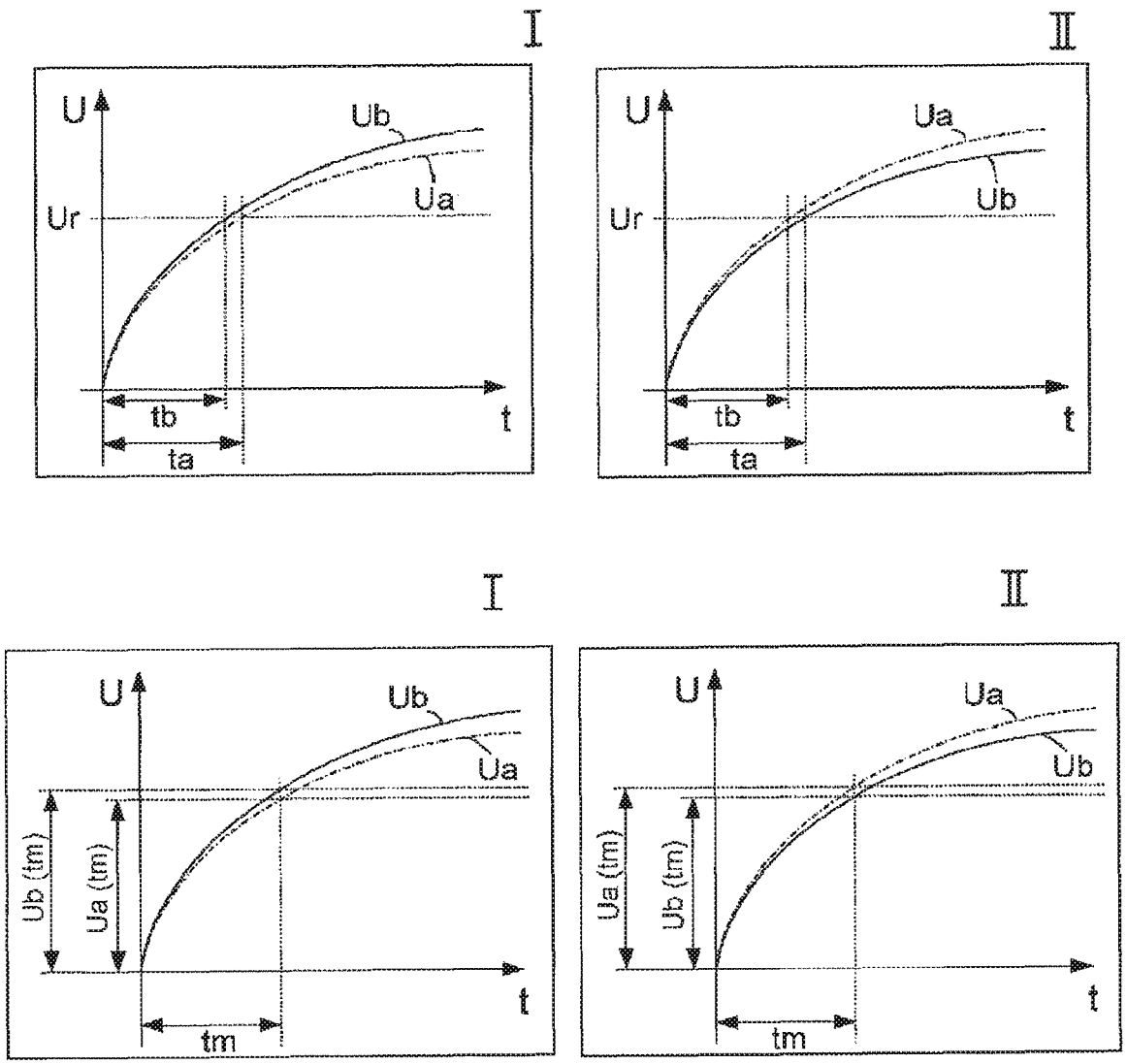
FIG. 4 depicts measurement diagrams of the voltage as a function of the time of the induction measurements in various armature positions, each with a time measurement and a voltage measurement, in embodiments with measuring resistance on the negative side.

The measurement methods according to FIG. 3 show measurements after the measuring currents are deactivated, i.e. when the measuring switch devices 17a, 17b or 17 are opened. FIG. 4 discloses corresponding measurements when the current is activated, i.e. when the measuring switch devices 17a, 17b or 17 according to FIG. 1 or FIG. 2 are closed. In this case, as well, the measurement path of the closed armature side according to FIGS. 1 and 2, i.e. the second or right measurement path 14b, demonstrates a greater time constant and thus a slower and/or more sluggish increase tendency.

In particular, the two measurements according to FIGS. 3 and 4 can also be carried out successively, and so the measuring switch devices 17a and 17b or the common measuring switch device 17 is initially closed according to FIG. 1 or FIG. 2, and the increase by the measuring current and/or the voltages Ua and Ub is measured, and measurements are thereafter carried out when the switch devices are deactivated and/or opened according to FIG. 3.

According to FIG. 1 and FIG. 2, the comparison device 20, i.e. the comparator 20 in this case, generates a status signal S1 in each case which reveals the armature position and thus the status of the solenoid valve device, i.e. the example shown in which S=1 in the first (left) armature position and S=0 in the second (right) armature position II.

Figure 5:
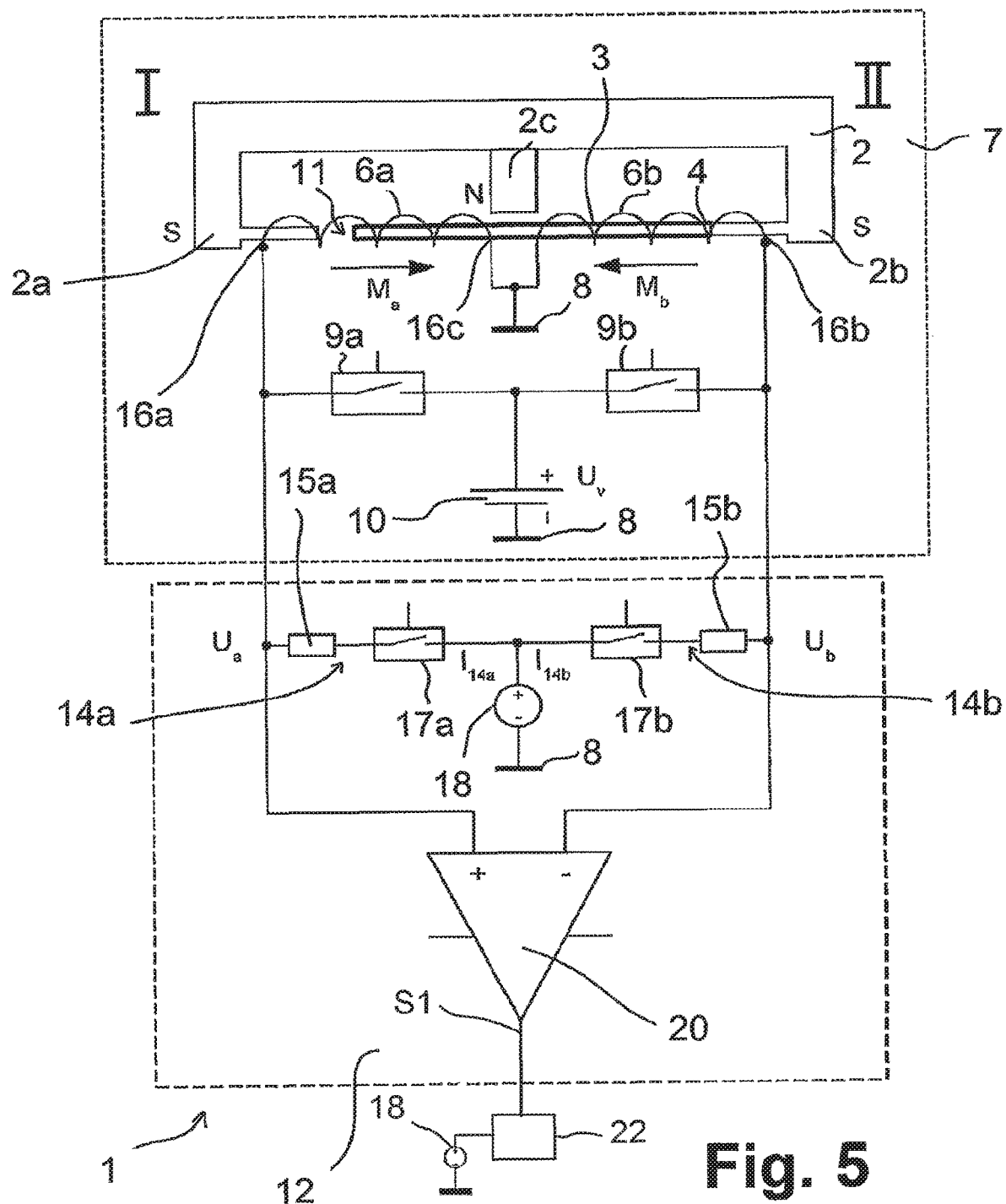
FIG. 5 depicts an embodiment corresponding substantially to FIG. 1 with stationary cores configured on the permanent magnet yoke.

FIG. 5 shows a configuration corresponding to FIG. 1, with pole bases 2a and 2b extending in the axial direction to attach the armature 3.

Figure 6:
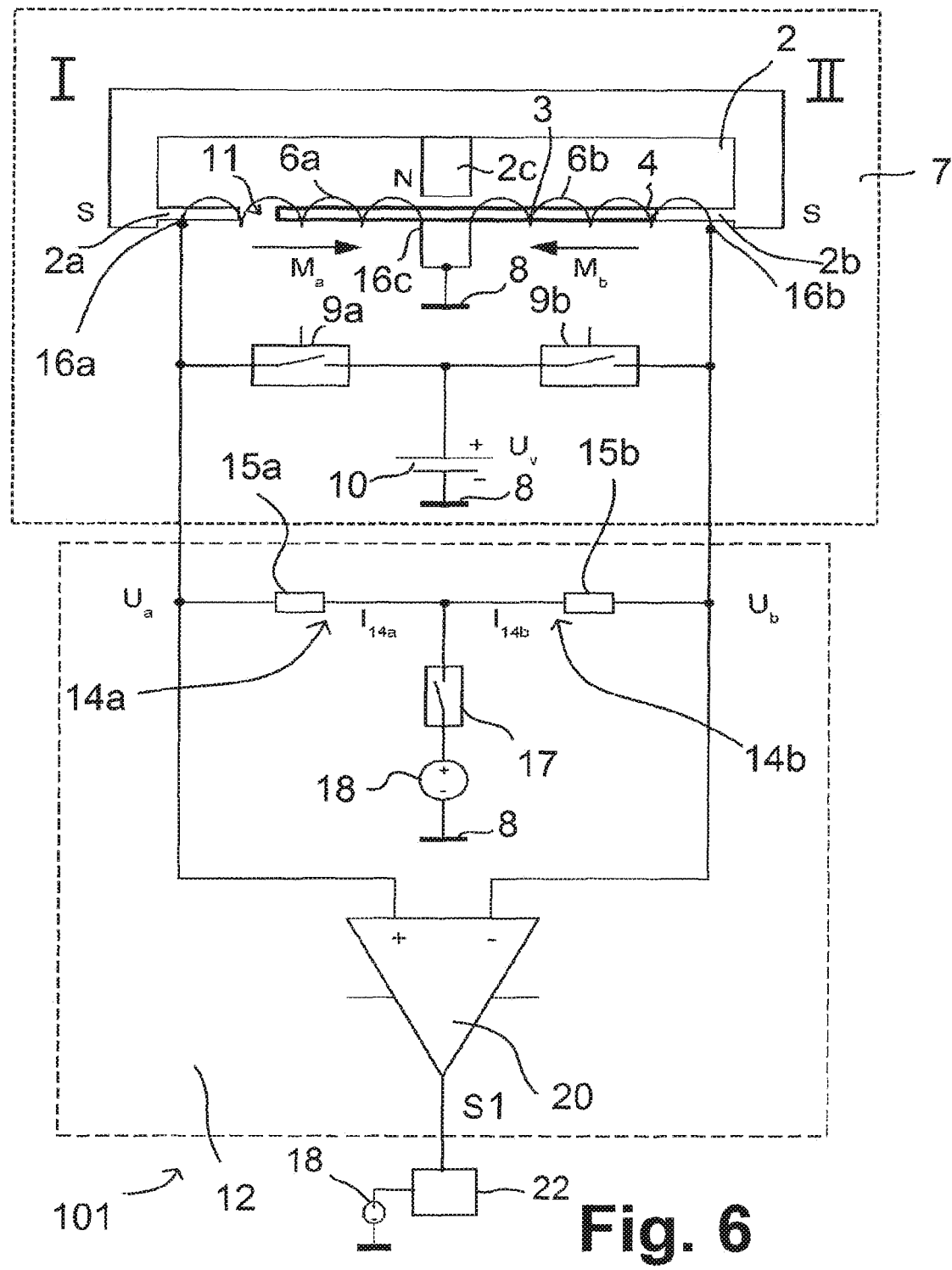
FIG. 6 depicts an embodiment corresponding substantially to FIG. 2 with cores configured on the permanent magnet yoke.

FIG. 6 shows a configuration corresponding to FIG. 2, with explicitly indicated pole bases 2a, 2b.

Figure 7:
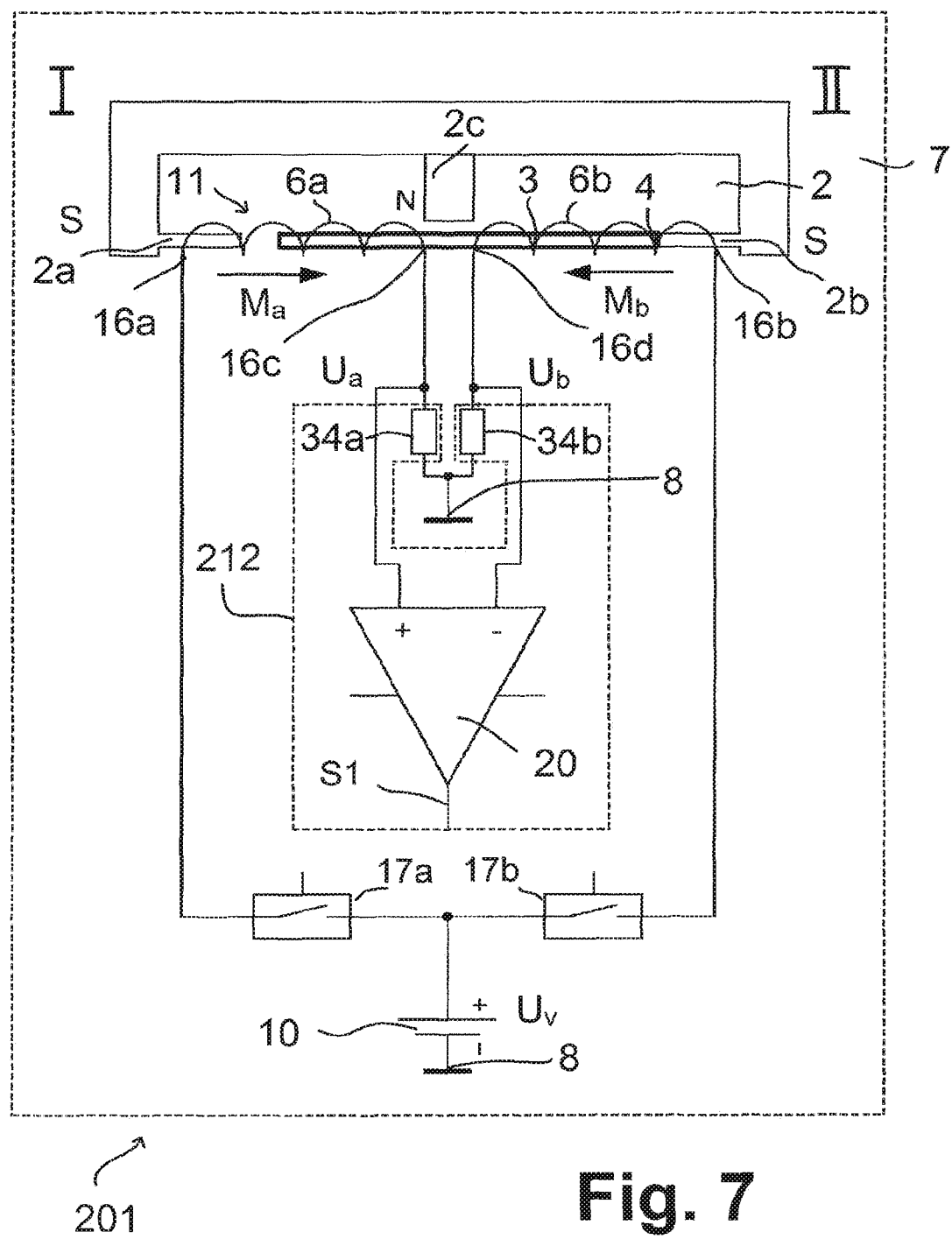
FIG. 7 depicts a solenoid valve device according to an embodiment of the invention, with shunt resistors provided in the power circuit.

FIG. 7 shows a further embodiment of a solenoid valve device 201, in which the detection device 212 is integrated into the power circuit:

According to FIG. 7 shunt resistors 34a, 34b are connected between the two ground terminals 16c of the first armature coil 6a and 16d of the second armature coil 6b. The shunt resistors 34a and 34b are sufficiently small that the power loss in the power circuit is not relevant. The power currents of the two armature coils 6a and 6b thus also act as measuring currents I-14a and I-14b. The measuring voltages Ua and Ub are tapped upstream of the shunt resistors 34a, 34b, i.e. between the shunt resistors 34a, 34b and the respective ground terminal 16c, 16d of the armature coils 6a and 6b, and are evaluated by the comparator 20 serving as a comparison device, according to the embodiments previously described.

Figure 8:
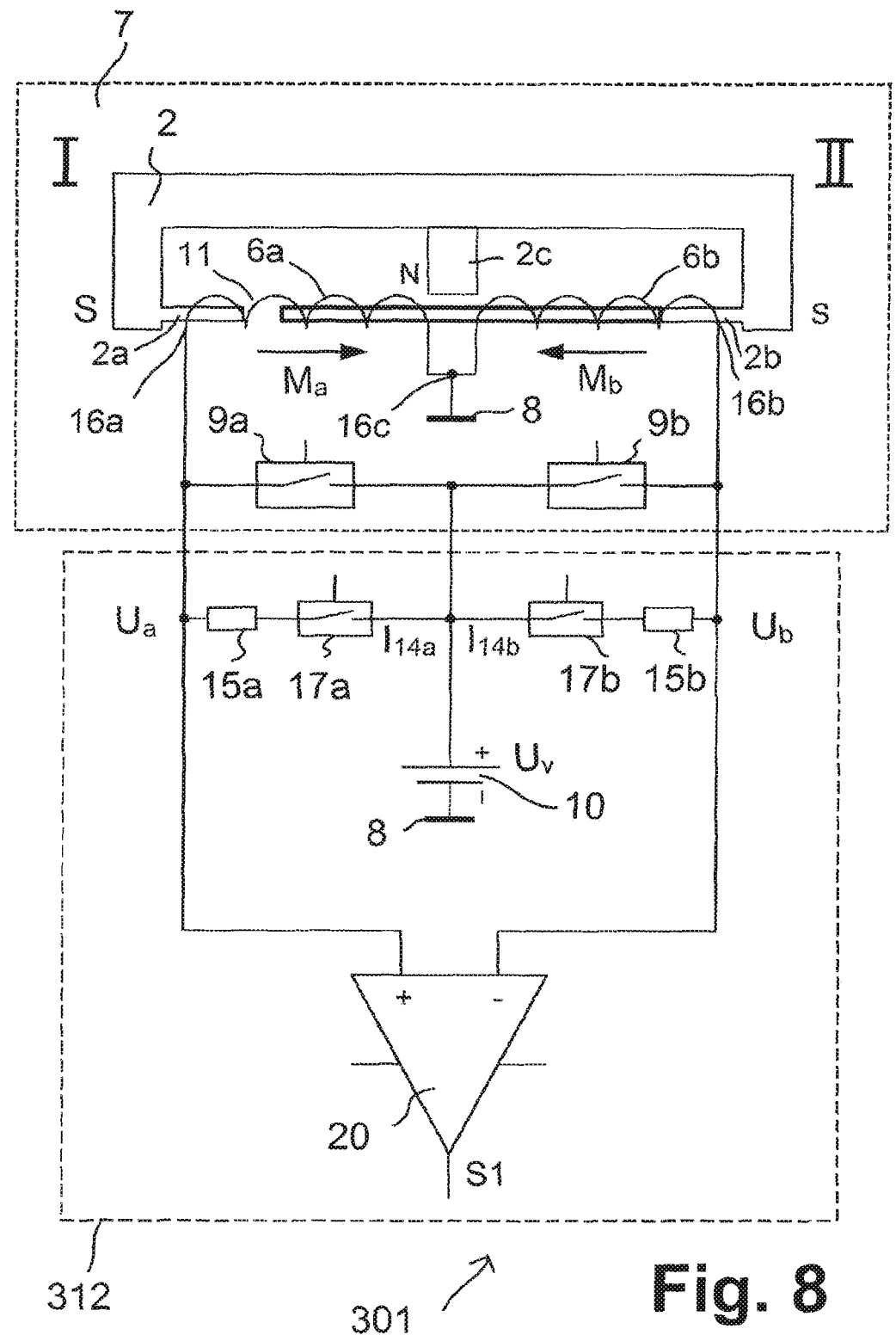
FIG. 8 depicts a solenoid valve device according to an embodiment of the invention, with a common voltage source for supplying power and detection.

FIG. 8 shows a further embodiment of a solenoid valve device 301, in which the detection device 312 is modified with respect to the embodiment according to FIG. 1 and FIG. 5 such that it uses the supply voltage source 10; therefore, a common voltage source, namely the supply voltage source 10, is provided both for the power circuit and for the detection device 312. Accordingly, higher first and second measuring resistances 15a, 15b are provided, e.g. in the range of a few kΩ, compared to the embodiment according to FIG. 1 and FIG. 5 so as not to initiate a switching process by the measuring currents I-14a and I-14b and also so that the energy consumption and the power loss that occurs during measuring can be kept low.

In the embodiments in FIGS. 1, 2, 5 and 6, existing voltage sources of e.g. 5 volts above 3.3 volts can be used as a measuring voltage source 18, especially also already in the control system 22 indicated here, which functions as a control and evaluation system to evaluate and recognize armature position I or II, and advantageously also to activate the power switches 9a and 9b for the switching processes (power switches). Thus no supplementary additional expense is required to create the measuring voltage source 18, nor is it necessary to form an additional voltage source.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS 1, 101, 201, 301 Solenoid valve device
2 Permanent magnet yoke
2a First (left) core/magnetic pole
2b Second (right) core/magnetic pole
2c centre core/magnetic pole
3 Armature
6a Left (first) armature coil
6b Right (second) armature coil
7 Solenoid valve
8 Ground
9a Left (first) power switch
9b Right (second) power switch
10 Supply voltage source
11 Air gap
12, 112, 212, 312 Detection device
14a First (left) measurement path
14b Second (right) measurement path
15a First (left) measuring resistor
15b Second (right) measuring resistor
16a First (left) coil terminal
16b Second (right) coil terminal
16c Common third ground coil terminal
17a First (left) measuring switch device
17b Second (right) measuring switch device
17 Common measuring switch device
18 Measuring voltage source
20 Comparison device, e.g. comparator
22 Control system
24a, b First, second shunt resistor
30 Fluid system
34a, 34b Shunt resistors
Uv Supply voltage
Ua, Ub Measuring voltages
I First (left) armature position
II Second (right) armature position
Ma First permanent magnet field
Mb Second permanent magnet field
I-14a First measuring current
I-14b Second measuring current
I-schalt Switching current, power switching current
S1 Status signal (armature position signal)

The invention claimed is:

1. A bistable solenoid valve device for a fluid system, the bistable solenoid valve device comprising:
a bistable solenoid valve having:
a permanent magnet yoke with a first pole base and a second pole base for the formation of a first ferromagnetic circuit and a second ferromagnetic circuit,
an armature consisting of a magnetically conductive material, configured to be displaced between a first armature position for contact against the first core to form an air gap with the second core and a second armature position for contact against the second core to form an air gap with the first core,
a first armature coil for supplying current for a displacement into the first armature position,
a second armature coil for supplying current for a displacement into the second armature position, and
a final stage for supplying current to in each case one of the armature coils for a displacement of the armature; and
a detection device configured to:
evaluate and/or measure a first inductance of the first armature coil, and evaluate and/or measure a second inductance of the second armature coil without displacement of the armature,
to compare the inductances of the first armature coil and the inductance of the second armature coil, and
to output a state signal that indicates the armature position.

2. The solenoid valve device according to claim 1, wherein the detection device comprises:
a first measurement path that is connected to a measurement voltage source for energizing the first armature coil for the measurement and/or evaluation of the first inductance,
a second measurement path that is connected to the measuring voltage source for energizing the second armature coil for the measurement and/or evaluation of the second inductance, and
a comparison device linked to the measurement paths.

3. The solenoid valve device according to claim 2, wherein the armature is configured to be displaced by the energization of the armature coils by a supply voltage source, and the measuring voltage source is different from the supply voltage source.

4. The solenoid valve device according to claim 3, further comprising a control system configured to receive the status signal, to activate a power switch device, and/or to activate a measuring switch device,
wherein the measuring voltage source configured to supply voltage to the control system.

5. The solenoid valve device according to claim 3, wherein the measuring voltage source provides a measuring voltage weaker than a supply voltage provided by the supply voltage source.

6. The solenoid valve device according to claim 4 wherein the comparison device is configured to compare the amount of the two measuring voltages after a predetermined measurement time in each case during a start-up process and/or shut-down process, and to generate the status signal as a function of a difference between the two measuring voltages.

7. The solenoid valve device according to claim 4 wherein the comparison device is configured to compare a duration of the two measuring voltages until a reference voltage is reached during a start-up process and/or a shut-down process.

8. The solenoid valve device according to claim 4 wherein the comparison device is configured to simultaneously receive the two measuring voltages or to receive the two measuring voltages successively.

9. The solenoid valve device according to claim 2, wherein the first measurement path has a first measuring resistor for creating a series connection of the first armature coil with the first measuring resistor to the measuring voltage source as a first voltage divider circuit, and
wherein the second measurement path has a second measuring resistor for creating a series connection of the second armature coil with the second measuring resistor to the measuring voltage source as a second voltage divider circuit,
wherein the first and second measuring resistors are the same size, and
wherein the comparison device compares an amount and/or a temporal behaviour of a first measuring voltage between the first measuring resistor and the first armature coil and a second measuring voltage between the second measuring resistor and the second armature coil.

10. The solenoid valve device according to claim 2 wherein at least one measuring switch device is provided for closing the measuring circuits via the measurement paths and the armature coils, and
wherein the measuring switch device is different from a power switch device for energizing the armature coils for the displacements of the armature.

11. The solenoid valve device according to claim 10, wherein separate measuring switch devices are provided in the first measurement path and the second measurement path for the simultaneous or successive energization of the measurement paths.

12. The solenoid valve device according to claim 10, wherein a common measuring switch device is provided for the two measurement paths.

13. The solenoid valve device according to claim 2, wherein the armature is configured to be displaced by the energization of the armature coils by a supply voltage source and power switch,
wherein each of the measurement paths is connected to the supply voltage source by a measuring switch and a measuring resistor parallel to the power switches, and
wherein the comparison device is configured to receive the measuring voltages falling across the measuring resistors and compare them.

14. The solenoid valve device according to claim 1, wherein the armature is configured to be displaced by the energization of the armature coils by a supply voltage source and power switch,
wherein the detection device comprises a first and a second shunt resistor and a comparison device,
wherein in each case a shunt resistor with an armature coil and a power switch is connected in series to the supply voltage source, and
wherein the comparison device is configured to receive the measuring voltages falling across the shunt resistors and to compare them.

15. The solenoid valve device according to claim 1, wherein the solenoid valve device is configured symmetrically with regard to the magnetic and electrical properties of the permanent magnet device, of the armature with its armature coils, and the measurement paths.

16. An electro-pneumatic parking brake having a solenoid valve device according to claim 1, wherein one armature position corresponds to a released parking brake, and the other armature position corresponds to an engaged parking brake.

17. A method for detecting an armature position of a bistable solenoid valve that is provided in a fluid system and that comprises a permanent magnet device with a first core, a second core, an armature, that can be displaced between a first armature position for contact against the first core and a second armature position for contact against the second core, and two armature coils for displacing the armature between the armature positions, the method comprising:
conducting a first measuring current from a measuring voltage source via a first measurement path and a first armature coil in a measuring operation without displacement of the armature, whereby a first measuring voltage, which is dependent upon the first inductance of the first armature coil, is formed,
conducting a second measuring current from the measuring voltage source via a second measurement path and a second armature coil whereby a second measuring voltage which is dependent upon the second inductance of the second armature coil, is formed, comparing a level and/or a temporal behaviour of the first measuring voltage and the second measuring voltage to each other, and generating a status signal as a function of the comparison.

18. The method according to claim 17, wherein the measuring voltages are generated at the same time and are compared to each other by a comparison device after a predetermined duration.

19. The method according to claim 18, wherein the durations of the measuring voltages until a predetermined voltage level is reached are compared to each other.

20. The method according to claim 18, wherein the measuring voltages are compared to each other by the comparison device by subtraction during a start-up process and/or a shut-down process.

* * * * *